(12) United States Patent
Ritter

(10) Patent No.: US 7,126,579 B2
(45) Date of Patent: Oct. 24, 2006

(54) METHOD FOR REQUESTING DESTINATION INFORMATION AND FOR NAVIGATING IN A MAP VIEW, COMPUTER PROGRAM PRODUCT AND NAVIGATION UNIT

(75) Inventor: Dieter Ritter, Fürth (DE)

(73) Assignee: Siemens Aktiengesellschaft, Munich (DE)

( * ) Notice: Subject to any disclaimer, the term of this patent is extended or adjusted under 35 U.S.C. 154(b) by 382 days.

(21) Appl. No.: 10/373,136

(22) Filed: Feb. 24, 2003

(65) Prior Publication Data

US 2003/0151592 A1    Aug. 14, 2003

Related U.S. Application Data

(63) Continuation of application No. PCT/DE00/02906, filed on Aug. 24, 2000.

(51) Int. Cl.
  G09G 5/00     (2006.01)
  G06F 3/00     (2006.01)
  G01G 21/26    (2006.01)

(52) U.S. Cl. .............. 345/156; 715/848; 715/863; 701/200; 701/212

(58) Field of Classification Search .......... 345/156, 345/419, 159, 161, 168, 173, 184; 715/848–855, 715/863, 716, 737, 739, 763, 782; 382/103, 382/106; 348/208.14, 211.99; 701/200, 701/212
See application file for complete search history.

(56) References Cited

U.S. PATENT DOCUMENTS

| | | | | |
|---|---|---|---|---|
| 5,850,206 A | * | 12/1998 | Kashiwagi | 345/418 |
| 6,002,808 A | * | 12/1999 | Freeman | 382/288 |
| 6,009,210 A | * | 12/1999 | Kang | 382/276 |
| 6,088,032 A | * | 7/2000 | Mackinlay | 715/848 |
| 6,141,014 A | * | 10/2000 | Endo et al. | 345/427 |
| 6,148,260 A | * | 11/2000 | Musk et al. | 701/200 |
| 6,181,343 B1 | * | 1/2001 | Lyons | 715/850 |
| 6,201,544 B1 | * | 3/2001 | Ezaki | 345/419 |
| 6,252,602 B1 | * | 6/2001 | Matsuda et al. | 345/589 |
| 6,288,704 B1 | * | 9/2001 | Flack et al. | 345/158 |

FOREIGN PATENT DOCUMENTS

| | | |
|---|---|---|
| EP | 0 897 170 A2 | 2/1999 |
| JP | 07084714 | 3/1995 |
| JP | 2000075991 | 3/2000 |
| WO | WO 98/35311 | 8/1998 |
| WO | WO 99/34276 | 7/1999 |
| WO | WO 99/35633 | 7/1999 |

OTHER PUBLICATIONS

International Search Report.

* cited by examiner

Primary Examiner—Henry N. Tran
(74) Attorney, Agent, or Firm—Baker Botts L.L.P.

(57) ABSTRACT

A method for querying target information within a card view (15) is disclosed wherein a three-dimensional object (151) is selected on the basis of a user input and data (152) linked thereto is outputted. Preferably, in order to navigate within the card view (15), the gestures of the user are evaluated. The user can then navigate within a card view in a virtual manner and can easily query target information relating to an object.

17 Claims, 6 Drawing Sheets

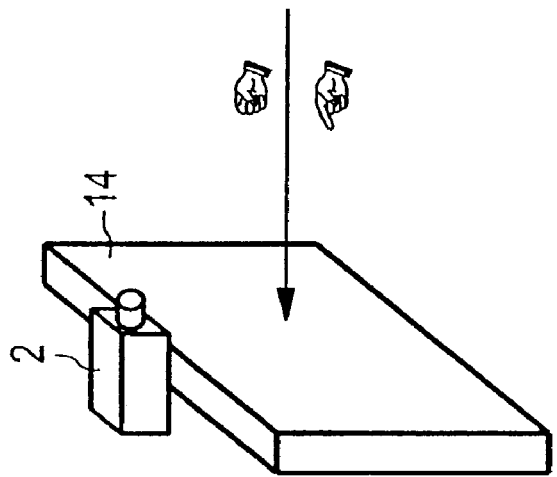
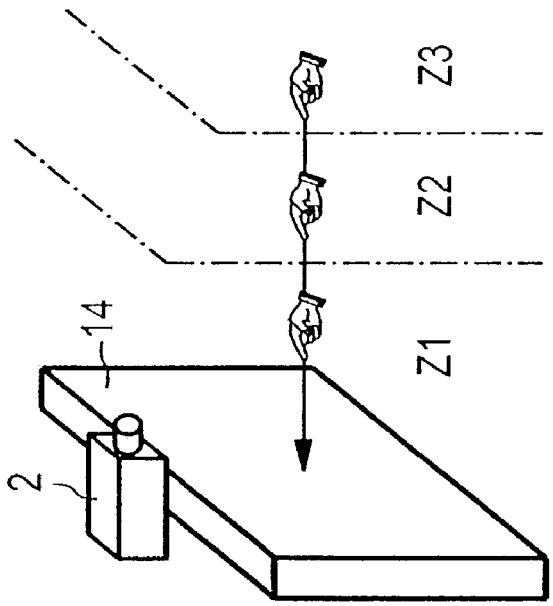
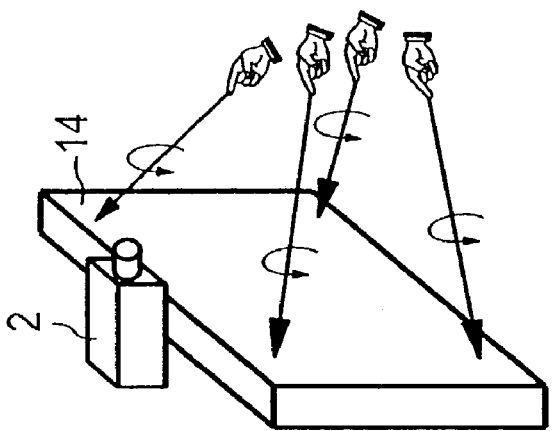

METHOD FOR REQUESTING DESTINATION INFORMATION AND FOR NAVIGATING IN A MAP VIEW, COMPUTER PROGRAM PRODUCT AND NAVIGATION UNIT

CROSS REFERENCE TO RELATED APPLICATION

This application is a continuation of copending International Application No. PCT/DE00/02906 filed Aug. 24, 2000, which designates the United States.

BACKGROUND OF THE INVENTION

The invention relates to a method for requesting destination information within a map view shown on a display device, to a method for navigating in a map view reproduced on a display device, to a computer program product storing one of these methods and to a navigation unit which is suitable for carrying out such methods.

Navigation calculations for determining a route from a starting point to a destination point are based on two-dimensional geoinformation data. The user of a route search program running on a computer or of a navigation unit arranged in a vehicle has to select the destination for his trip by inputting letters or by making a selection from a predefined list. To this end, he needs to know the name of his destination already, however. This is often not the case in foreign places. In the same way, he can request destination information relating to the points (points of interest) included in the data, for example filling stations, museums, hotels, multistory car parks or the like. In large cities, however, he will, regularly be provided with a confusingly large number of options in this regard. A way of visually searching for a particular area by altering a map view, that is to say of navigating in a map, is not provided.

The European patent specification EP 0 366 132 B1 discloses a multifunction control device for motor vehicles which has a rotary switch which can be used to input the series of letters in a destination for a navigation unit. This does not allow orientation of the user within a road map view which is output on a display device.

The international application WO 99/19788 discloses a system for real-time identification of gestures. If the system identifies a gesture made by a person, a computer performs an operation which is based on the semantic meaning of the gesture. Thus, by way of example, a person's moving his arms up and down is converted into the image of a bird in flight.

SUMMARY OF THE INVENTION

It is the aim of the invention to provide user-friendly methods, a computer program product and a navigation unit which allow simple, visual orientation within a map view shown on a display device.

This aim can be achieved by a method for requesting destination information within a map view shown on a display device, comprising the following steps:
following a user input, a map view is moved in one direction in order to find data which are linked to a three-dimensional object,
a displayed, three-dimensional object is selected in the map view on the basis of a user input,
data linked to the selected object and stored in a database are output.

The three-dimensional object can be a building, and an interior view of the building can be output. The linked data can be reproduced in the map view and can be output in association with the selected, three-dimensional object. Data relating to the three-dimensional object can be retrieved from the Internet. The data retrieved for the object may feature a telecommunications address, and the selection of the telecommunications address can be followed by telecommunications contact being set up to the telecommunications address.

The aim can also be achieved by a method for navigating in a map view reproduced on a display device, comprising the following steps:
a user's gestures are detected and evaluated,
the map view is moved in the direction in which the user is pointing.

Defined space zones may correspond to particular directions of movement of the map view. The speed at which the map view is moved can be determined by that region in one of the space zones in which a hand of the user is identified. The method may relate to navigation in a map view, wherein the speed at which the map view is moved is dependent on the speed with which the gesture is made. The method may also relate to navigation in a map view, wherein destination information is requested by the following steps:
following a user input, a map view is moved in one direction in order to find data which are linked to a three-dimensional object,
a displayed, three-dimensional object is selected in the map view on the basis of a user input,
data linked to the selected object and stored in a database are output.

An object may be selected on the basis of the interpretation of gestures from a user. The method may relate to navigation in a map view, wherein an object selected on the map view is used as a destination coordinate for route calculation. The method may relate to navigation in a map view, wherein at least one selected map view is output on a portable data processing unit.

The aim may further be achieved by a computer program product which is stored on a storage medium and can be loaded into the main memory of a processor and executes the following steps using the processor:
following a user input, a map view is moved in one direction in order to find data which are linked to a three-dimensional object,
a displayed, three-dimensional object is selected in the map view on the basis of a user input,
data linked to the selected object and stored in a database are output.

Also, the aim may be achieved by a computer program product which is stored on a storage medium and can be loaded into the main memory of a processor and executes the following steps using the processor:
a user's gestures are detected and evaluated,
the map view is moved in the direction in which the user is pointing.

The aim may also be achieved by a navigation unit which comprises:
a display device,
a camera for detecting gestures from a user,
a processor for calculating control information and map views on the basis of gestures from a user.

By virtue of a user being able to move a map view and to select a displayed object directly in a map view in order to retrieve information or data linked to this object, no complex searching in lists is required. The user can be certain that the information retrieved is associated with the selected object at the location he is considering. He does not need to know the name or the address of the object, since he can make his selection on the basis of the visual, three-dimensional view of objects which is presented. The user can thus visually reconnoiter an area which is foreign to him and can fetch relevant information relating to objects under consideration. The data which are of interest to the user are organized and arranged according to graphical, three-dimensional objects. There is a database-type link between a graphical object associated data.

If the object is a structure or building, then the information which can be displayed relates, by way of example, to the facilities accommodated in the building, such as a museum, a hotel, a restaurant, a cinema or a shop. In addition, the data which are output can be the interior view of a building, for example rooms in a hotel or a virtual tour through a museum.

The information which can be displayed can be, by way of example, a telecommunications address in the form of a home page on the Internet, an e-mail address, a fax number or a telephone number.

If a link from the information displayed points to an associated home page on the Internet, a user can retrieve current information relating to the facilities accommodated in the building. This can be, by way of example, the current list of films at the cinema, the current menu for a restaurant, the goods and/or services sold by a shop or the occupancy of a hotel. If the information output is a telephone number, then by confirming the telephone number it is possible to initiate a call in order to make a reservation in a restaurant or hotel, for example.

The selection between the three-dimensional objects provided in a map view and navigation in a map view can be made using a rotary switch which can be used to change between the objects displayed, a joystick, arrow keys, a touchpad, by touching the objects displayed on a touch-sensitive screen (touchscreen) or by means of voice input. Preferably, however, an object is selected by virtue of the detection and evaluation of gestures from the user.

Navigation in the map view is possible by virtue of gestures from the user being detected and evaluated. The map view is moved in that direction in which the user moves his hand or in which he points.

This allows the user to move through the map view virtually and even to enter a selected building. He can obtain an overview of the immediate surroundings of a destination or of his current position. For the objects which he has approached virtually, he can request destination information in the manner outlined or else can establish contact over the Internet or by telephone.

In addition, a selected object, for example a square, a building or a point on a road, can be used as a destination coordinate for route calculation.

Preferably, the methods described are carried out using a navigation unit which is connected to a camera for detecting gestures from the user.

BRIEF DESCRIPTION OF THE DRAWINGS

Other advantages, features and opportunities for application of the invention can be found in the description below of an exemplary embodiment in conjunction with the drawings, in which:

FIGS. 2a–2c show the control of a 3D browser by means of gestures,

DETAILED DESCRIPTION OF THE PREFERRED EMBODIMENTS

Figure 1:
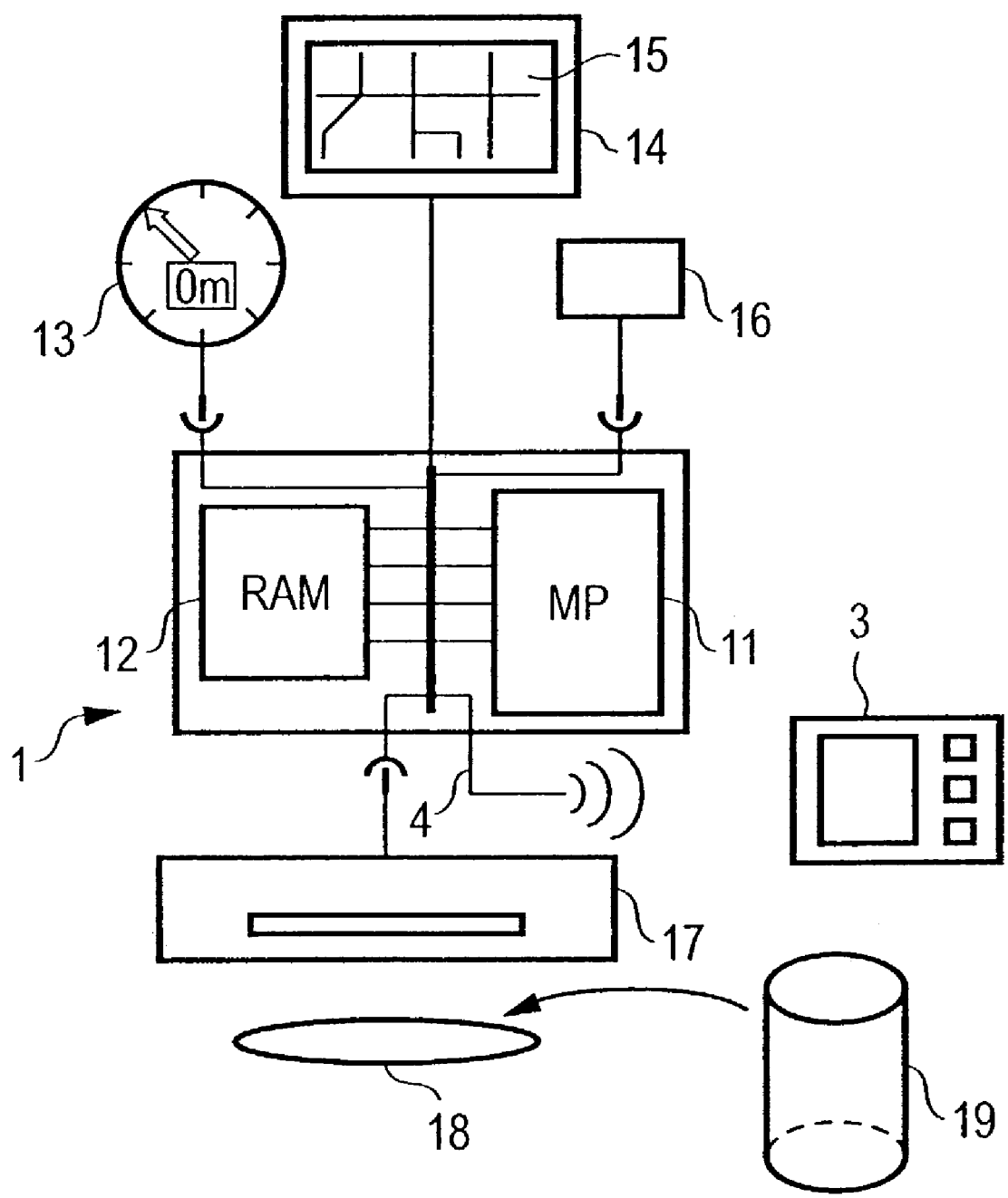
FIG. 1 shows a navigation unit.

FIG. 1 shows a navigation unit 1 which features a processor 11 for calculating routes between a starting point and a destination point and for calculating map views. The processor 11 has access to a main memory 12. A sensor unit 13 connected to the processor by means of a bus system comprises a distance meter (odometer), a direction sensor (gyroscope) and a satellite receiver.

The processor 11 outputs a map view 15 on a display device 14.

The navigation unit is also equipped with a telephone module 16 operating on the basis of the UMTS standard.

The processor receives the data required for route calculation and image display either by means of wireless transmission by the telephone module 16 or by reading them from a storage medium 18, which is a DVD (Digital Versatile Disc), using a drive 17. The DVD stores a program product containing a piece of navigation software which allows destination information to be requested and allows navigation in a map view. In addition, two different databases 19 are stored on the DVD, one of which is shown symbolically. If it is possible to overwrite the storage medium, the data contained thereon can be updated via the telephone module 16 or via a wireless interface 4 (e.g. Bluetooth).

A database contains two-dimensional road map data which comprise a network of road segments with nodes or points of intersection. The second database is a geodatabase containing three-dimensional objects in the form of building and topology data. In addition, there can also be a texture database which contains an image of the surface for the three-dimensional building and topology data.

A portable data processing unit 3, which is a PDA (Personal Digital Assistant), can have individual selected map views transmitted to it, together with the data associated with the three-dimensional objects, via the interface 4.

FIG. 2 shows a schematic illustration of the display device 14 and of a video camera 2 which is connected to the navigation unit.

The camera records gestures which a user makes with one hand. These gestures are evaluated by the microprocessor in the navigation unit or by another microprocessor. A suitable method for this is disclosed in the international patent application WO 99/19788, for example.

The map view is moved in that direction in which the user points with his hand or with a finger on the hand. If the user points to the left, then his virtual angle of vision moves to the left, which means that objects marked further to the left on the map which have not yet been in the field of vision appear in the field of vision and, accordingly, objects on the right-hand side disappear from the field of vision. In the same way, the field of vision can be swung upward or downward or toward the top left or toward the bottom right, etc.

It is possible to evaluate not only the change in the angle of azimuth or in the angle of elevation in the manner described, but also the change in an angle of roll if, by way of example, a hand or a finger is used to make a circular motion. In response to such a circular motion, the map view is rotated around the viewing direction. In this way, an object situated in the center of the map view can be considered from all sides.

Besides this, the map view can be moved into or out of the depth of the space. To this end, space zones are defined which have an associated direction of movement.

A first space zone Z1 extends away from the screen up to a distance of approximately 0.1 m. A second space zone Z2 defines the interval of space from 0.1 to 0.2 m in front of the display device. A third space zone is defined at a distance of 0.2 to 0.3 m in front of the display device.

If the tip of the hand is in the first space zone Z1, the map view is moved into the depth of the space. The current virtual location is therefore moved on, for example along a road. In this way, a road can be searched for points of interest, for example attractions, churches, museums, filling stations, restaurants, hotels, shops and the like without actually needing to drive or walk down the road beforehand. In the same way, a route calculated by the navigation unit can be driven along virtually beforehand in order to establish whether this route is what the user expects.

If the user stops his hand in the second space zone Z2, the movement in the depth of the space is stopped. If, on the other hand, it is established that the hand is in the third space zone Z3, then the map view is moved backward, that is to say there is a movement out of the depth of the space.

In this way, an object, for example a structure or a distinctive natural object, can be moved into the center of the field of vision. This object can then be selected either by means of a gesture, for example the bending of a finger or the formation of a fist, or by operating a key, a knob, a joystick, a touchpad or by tapping on a touchscreen, in order to retrieve information relating thereto.

If the finger on one hand points upward, the user's virtual location is moved upward. He is thus provided with a better overview of a terrain which is under consideration. He can thus look for swimming baths or attractions from a bird's-eye view, for example. When he has spotted a destination, he can approach it and can look at it from all angles in an enlarged view.

An instrument or browser for three-dimensional navigation in a map view is thus realized. This provides useful information management for a confusingly large amount of information linked to the object within the stored database and/or over the Internet.

Figure 3:
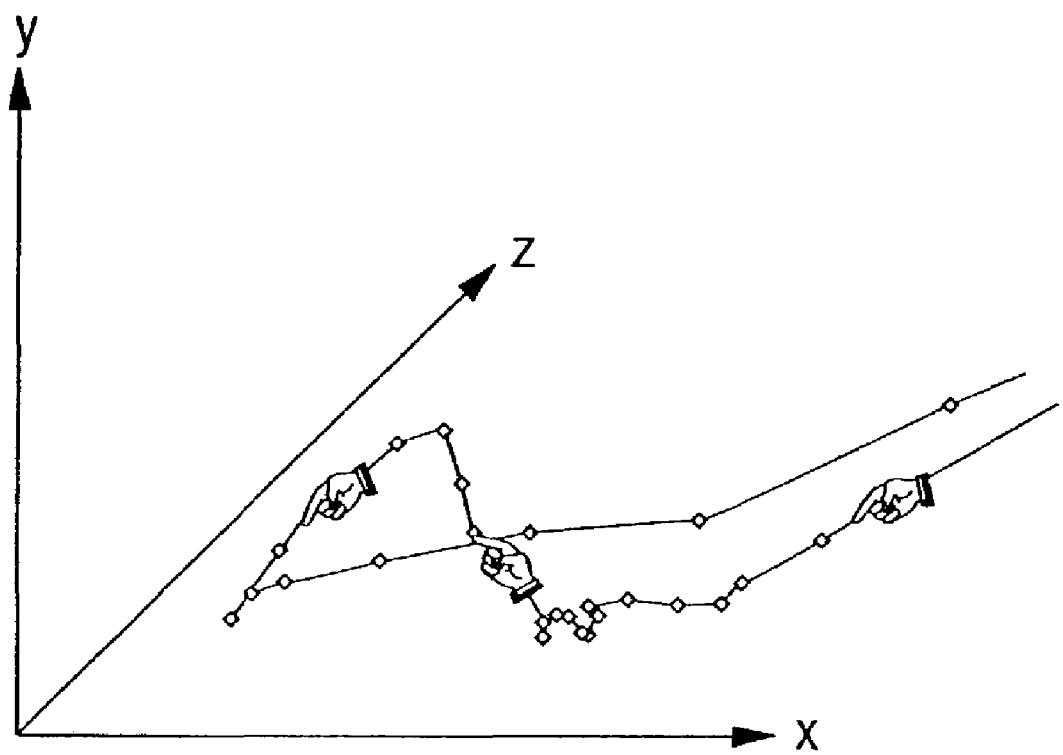
FIG. 3 shows the tracking of a dynamic gesture in three-dimensional space.

FIG. 3 illustrates the evaluation of gestures in three-dimensional space. The changes in the angle of azimuth, in the angle of elevation, in the angle of roll and in the translation are recorded in the video image and are evaluated.

In response to the gesture identified, the virtual position in the map view is changed incrementally and the three-dimensional scene is redrawn using the current, new virtual position.

If a selection command is identified, the selected object is marked and supplementary information linked to the object is output. The supplementary information can either be stored directly together with the objects on the storage medium or can be linked to an Internet home page with the object using a link contained in the database.

Figure 4:
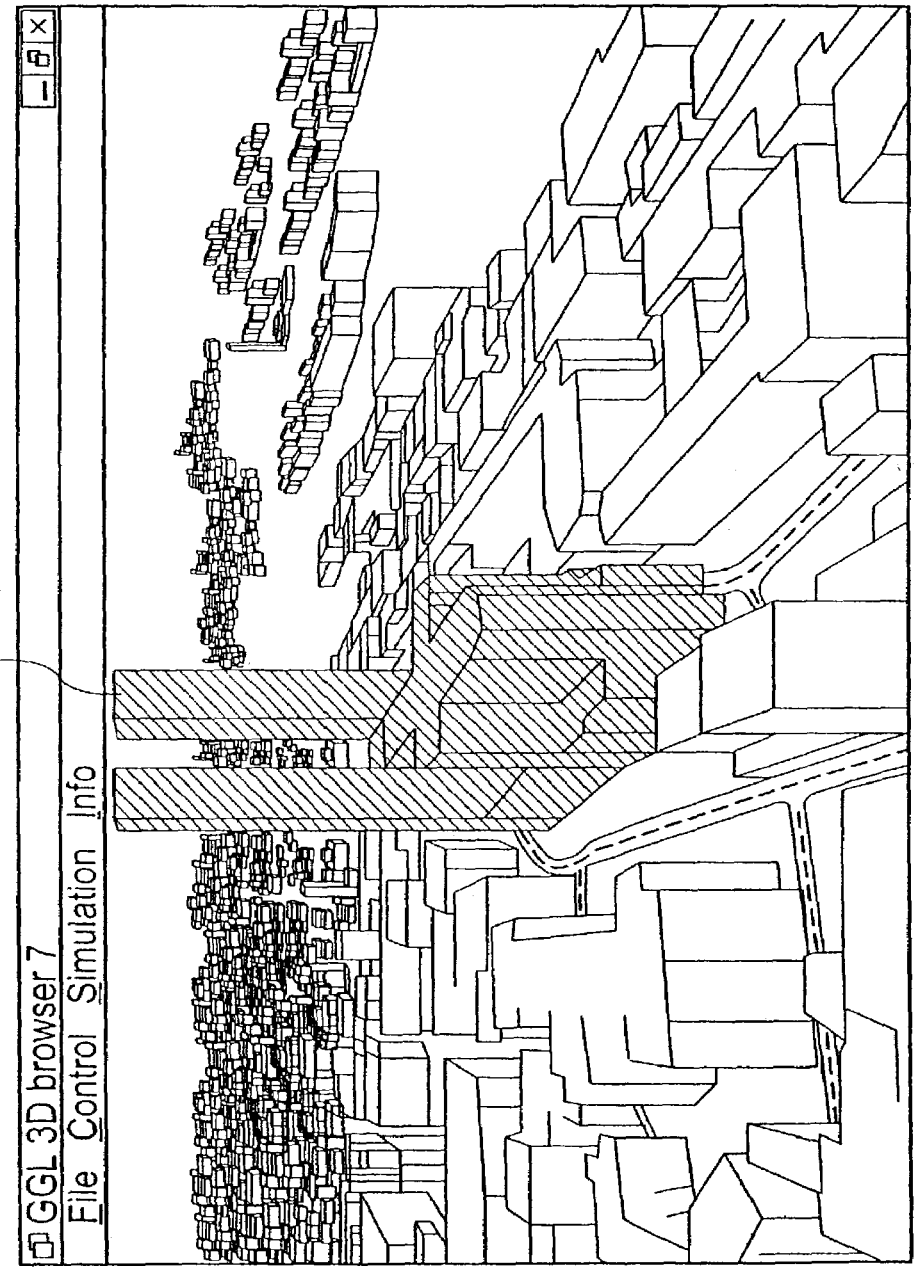
FIG. 4 shows a selected object.

FIG. 4 shows a physical, three-dimensional map view 15 with such a selected object 151. This object is a church.

To obtain the three-dimensional map view, two-dimensional road map data from a road map database containing a network of road segments are linked to three-dimensional data from a geodatabase. The road segments are connected to one another by means of nodes. The node has associated geocoordinates. For these nodes for a road segment which is to be output, a respective associated point in the three-dimensional data is ascertained. The road segments are entered together with the points ascertained in the 3D data.

The data in the geodatabase are obtained by means of aerial photographs. The individual photographs are converted into vector graphics.

Objects for which supplementary information can be retrieved can be marked by special symbols in the map view.

Figure 5:
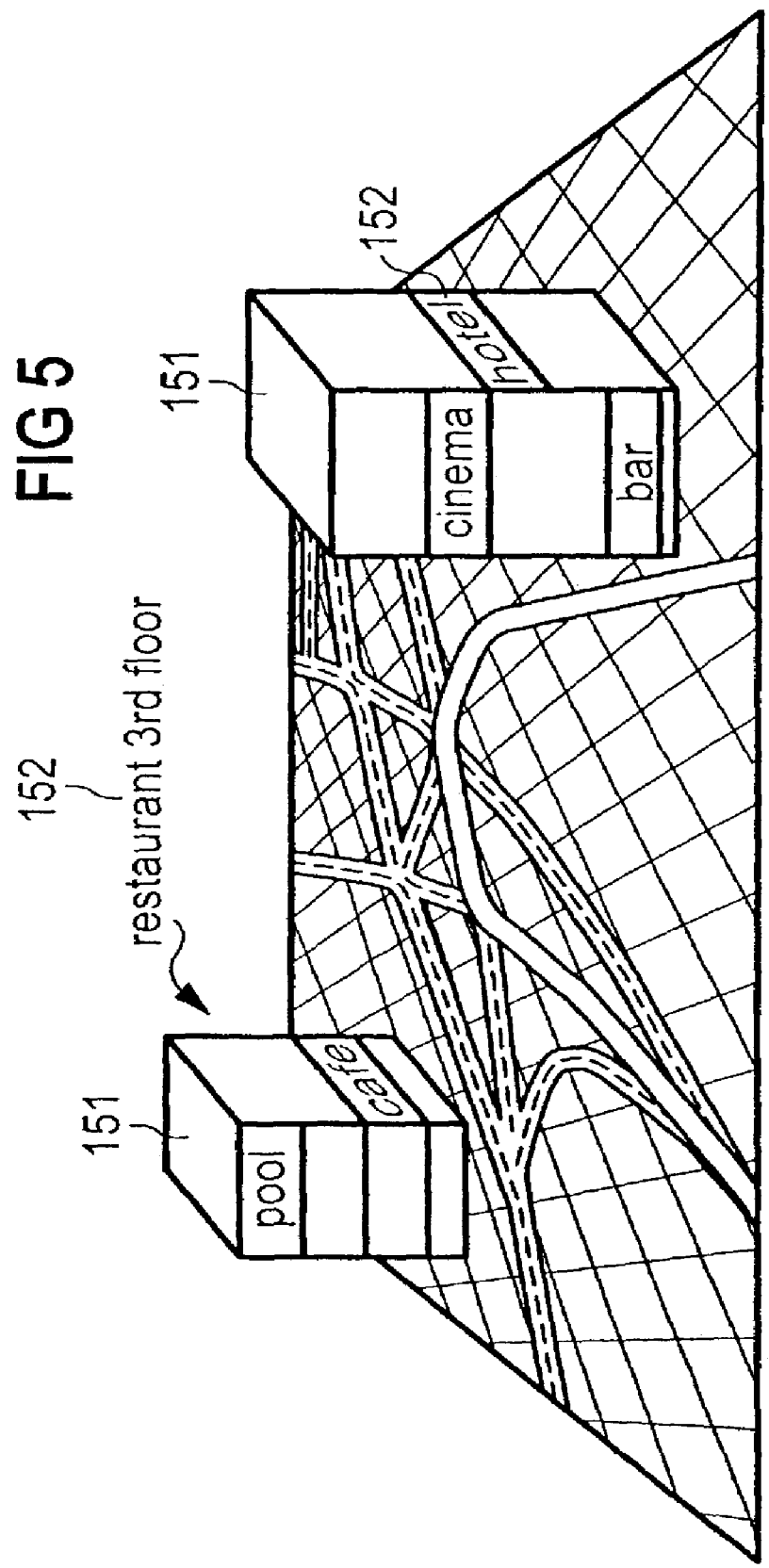
FIG. 5 shows the physical association of data which are output.

FIG. 5 illustrates the physical association between data 152 stored in the database and a plurality of graphical objects 151 selected simultaneously.

The figure shows the position of two buildings in a map view. It also shows where within the buildings certain facilities are located. Thus, in the case of the building on the left, it is possible to see that there is a cafe on the right-hand side on the ground floor. In addition, a pool room has been marked at the front of the building on the top floor. At the back of the building, which cannot be seen, an arrow points to a restaurant on the third floor.

In addition, appropriate links to the corresponding home pages on the Internet can be used to retrieve additional information relating to the facilities. Thus, by way of example, it is possible to request the occupancy of a hotel or free tables in a restaurant. For this purpose, a three-dimensional view of the rooms in the hotel or of the dining room in the restaurant can be displayed. Normally, the home page contains a link with an associated e-mail address. This allows a reservation to be made in the hotel or in the restaurant. This merely requires navigation in a map view. The name or the home page of the contact do not need to be known. It is thus enough to have visual contact in a virtual map view in order to be able to interact with a third party.

Figure 6:
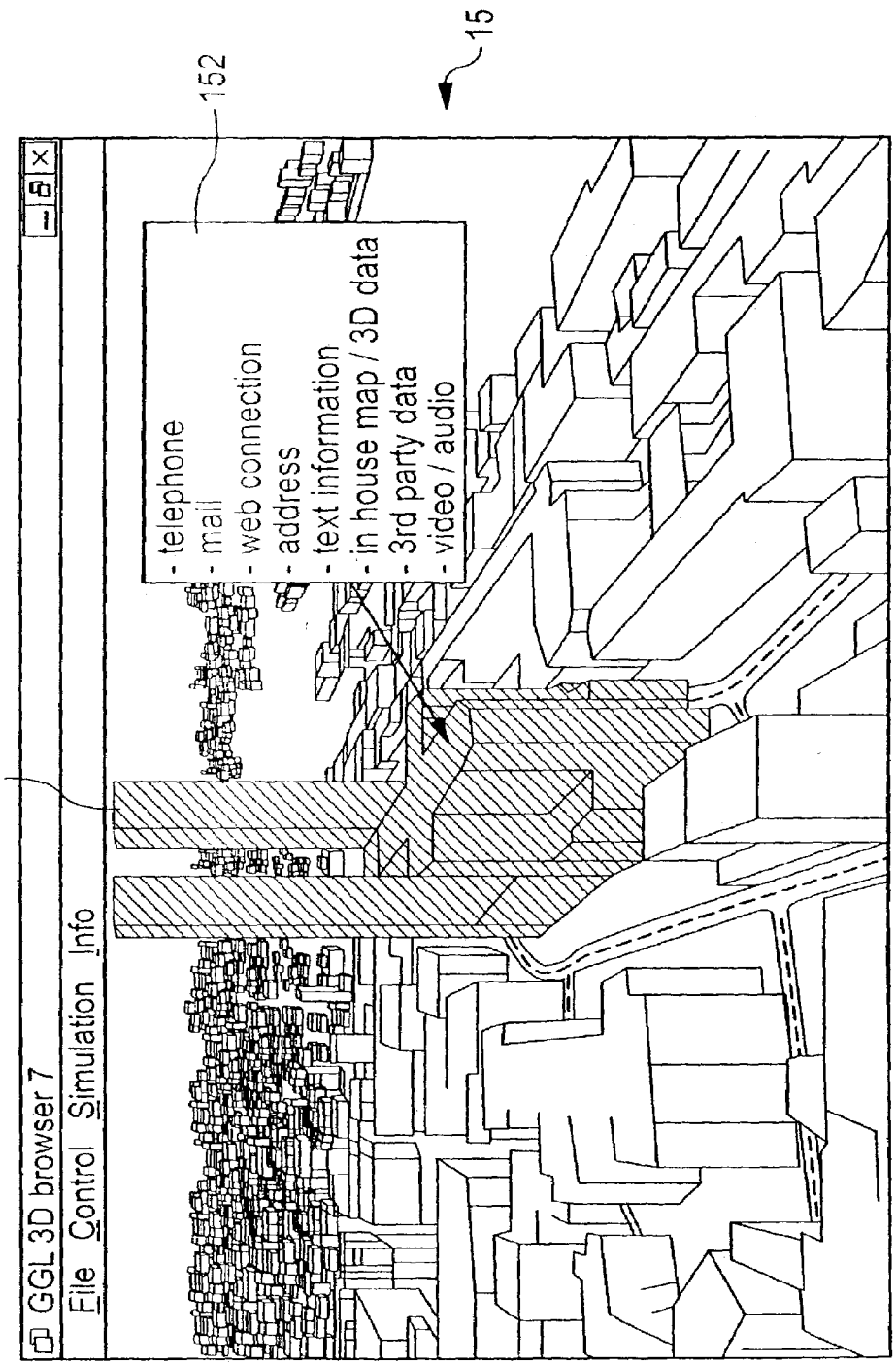
FIG. 6 shows a selected object.

FIG. 6 shows a graphical, three-dimensional object 151, namely a building, selected in a map view 15. When the object 151 has been selected, a menu is automatically output which indicates the type of data and information available for the object. These include a telephone number, an e-mail address, an Internet address, a postal address, descriptive textual information relating to the object, a three-dimensional interior view of the building, data from third parties which are stored in relation to the building, for example advertising, and also video and audio information. When one of the menu items has been input, the associated information is output.

The invention claimed is:

1. A method for requesting destination information within a map view shown on a display device, comprising the following steps:

following a user input, a map view is moved in one direction in order to find data which are linked to a three-dimensional object, a displayed, three-dimensional object is selected in the map view on the basis of a user input, data linked to the selected object and stored in a database are output, wherein the data relating to the three-dimensional object are retrieved from the Internet, wherein the data retrieved for the object feature a telecommunications address, and wherein selection of the telecommunications address is followed by telecommunications contact being set up to the telecommunications address.

2. The method as claimed in claim 1, wherein the three-dimensional object is a building, and an interior view of the building is output.

3. The method as claimed in claim 1, wherein the linked data are reproduced in the map view and are output in association with the selected, three-dimensional object.

4. A computer program product which is stored on a storage medium and can be loaded into the main memory of a processor and executes the following steps using the processor:
following a user input, a map view is moved in one direction in order to find data which are linked to a three-dimensional object,
a displayed, three-dimensional object is selected in the map view on the basis of a user input,
data linked to the selected object and stored in a database are output, wherein the data relating to the three-dimensional object are retrieved from the Internet, wherein the data retrieved for the object feature a telecommunications address, and wherein selection of the telecommunications address is followed by telecommunications contact being set up to the telecommunications address.

5. A method for requesting destination information within a map view shown on a display device, comprising the following steps:
following a user input, a map view is moved in one direction in order to find data which are linked to a three-dimensional object,
a displayed, three-dimensional object is selected in the map view on the basis of a user input,
data linked to the selected object and stored in a database are output, wherein the data retrieved for the object feature a telecommunications address, and wherein selection of the telecommunications address is followed by telecommunications contact being set up to the telecommunications address.

6. A method for navigating in a map view reproduced on a display device, comprising the following steps:
a user's gestures are recorded and evaluated,
the map view is moved in the direction in which the user is pointing, wherein defined space zones correspond to particular directions of movement of the map view.

7. The method as claimed in claim 6, relating to navigation in a map view, wherein at least one selected map view is output on a portable data processing unit.

8. The method as claimed in claim 6, wherein the speed at which the map view is moved is determined by that region in one of the space zones in which a hand of the user is identified.

9. The method as claimed in claim 6, relating to navigation in a map view, wherein the speed at which the map view is moved is dependent on the speed with which the gesture is made.

10. The method as claimed in claim 6, relating to navigation in a map view, wherein destination information is requested by the following steps:
following a user input, a map view is moved in one direction in order to find data which are linked to a three-dimensional object,
a displayed, three-dimensional object is selected in the map view on the basis of a user input,
data linked to the selected object and stored in a database are output.

11. The method as claimed in claim 10, wherein an object is selected on the basis of the interpretation of gestures from a user.

12. The method as claimed in claim 6, relating to navigation in a map view, wherein an object selected on the map view is used as a destination coordinate for route calculation.

13. A method for navigating in a map view reproduced on a display device, comprising the following steps:
a user's gestures are recorded and evaluated,
the map view is moved in the direction in which the user is pointing, wherein the speed at which the map view is moved is dependent on the speed with which the gesture is made.

14. The method as claimed in claim 13, wherein defined space zones correspond to particular directions of movement of the map view.

15. The method as claimed in claim 14, wherein the speed at which the map view is moved is determined by that region in one of the space zones in which a hand of the user is identified.

16. A method for requesting destination information within a map view shown on a display device, comprising the following steps:
following a user input, a map view is moved in one direction in order to find data which are linked to a three-dimensional object,
a displayed, three-dimensional object is selected in the map view on the basis of a user input,
data linked to the selected object and stored in a database are output, wherein the three-dimensional object is a building, and wherein an interior view of the building is output, wherein the data retrieved for the object feature a telecommunications address, and wherein selection of the telecommunications address is followed by telecommunications contact being set up to the telecommunications address.

17. The method as claimed in claim 16, wherein the linked data are reproduced in the map view and are output in association with the selected, three-dimensional object.

* * * * *